United States Patent [19]
Yamamoto et al.

[11] Patent Number: 5,710,660
[45] Date of Patent: Jan. 20, 1998

[54] GAIN-CONTROLLABLE OPTICAL AMPLIFIER AND OPTICAL GAIN-CONTROL METHOD

[75] Inventors: Shu Yamamoto; Hidenori Taga; Noboru Edagawa; Shigeyuki Akiba; Kuniaki Motoshima; Katsumi Takano; Tadayoshi Kitayama, all of Tokyo, Japan

[73] Assignees: Kokusai Denshin Denwa Co., Ltd.; Mitsubishi Denki Kabushiki Kaisha, both of Tokyo, Japan

[21] Appl. No.: 606,653

[22] Filed: Feb. 26, 1996

[30] Foreign Application Priority Data

Mar. 8, 1995 [JP] Japan .................. 7-048397

[51] Int. Cl.$^6$ .................. H01S 3/00; H01S 3/131; C02B 6/00
[52] U.S. Cl. .................. 359/341; 359/179; 372/6
[58] Field of Search .................. 359/134, 160, 359/341, 345; 372/6

[56] References Cited

U.S. PATENT DOCUMENTS

| | | | |
|---|---|---|---|
| 5,050,949 | 9/1991 | DiGiovanni | 359/341 |
| 5,245,690 | 9/1993 | Aida et al. | 385/142 |
| 5,268,786 | 12/1993 | Matsushita et al. | 359/341 |
| 5,299,048 | 3/1994 | Suyama | 359/179 |
| 5,343,320 | 8/1994 | Andersen | 359/160 |
| 5,355,248 | 10/1994 | Hadjifotiou | 359/341 |
| 5,374,973 | 12/1994 | Maxham et al. | 359/341 |
| 5,455,704 | 10/1995 | Mizuochi et al. | 359/179 |
| 5,517,351 | 5/1996 | Hatakeyama | 359/341 |
| 5,521,753 | 5/1996 | Fabe et al. | 359/341 |
| 5,546,221 | 8/1996 | Harasawa | 359/341 |

FOREIGN PATENT DOCUMENTS 3252231 11/1991 Japan.

OTHER PUBLICATIONS

S. Konoshita, M. Suyama & H. Kuwahara "Novel Configuration for Low Noise Er–Doped Fiber Optical Amplifiers During Automatic–Level–Controlled Operation" pp. 166–169.

Nakagawa et al, NTT Transmission System Laboratories, PdP11-1; <Oct. 13, 1995.

*Primary Examiner*—Nelson Moskowitz
*Attorney, Agent, or Firm*—Wolf, Greenfield & Sacks, P.C.

[57] ABSTRACT

This invention provides an optical amplifier which has low noise characteristics for a wide range of input signal electric power. The optical amplifier has a plurality of cascaded optical amplifying units, a signal level detector, and a pump-source controller. The pump-source controller changes controlling objects from a pump-source corresponding to a first one of the optical amplifying units to a pump-source corresponding to a second one of the optical amplifying units according to a detection level of the signal level detector from a low level to a high level. When the detection level is outside of a control object range, the optical amplifier controls an output from the pump-source to stabilize. When the detection level is within the control object range, the optical amplifier controls an output from a pump-source of each of optical amplifying units according to the detection level.

25 Claims, 11 Drawing Sheets

GAIN-CONTROLLABLE OPTICAL AMPLIFIER AND OPTICAL GAIN-CONTROL METHOD

BACKGROUND OF THE INVENTION

1. Field of the Invention

This invention relates to an optical amplifier with an optical fiber, and particularly to an optical amplifier, which has a gain-control function to stabilize an optical output power regardless of an optical input power.

2. Description of the Related Art

A fiber optical amplifier has desirable characteristics, e.g. a possibility to simplify a repeater to be independent of a transmission rate, a possibility to realize a mass capacity by multiplexing wavelengths, etc., in comparison with an optical repeater with 3R functions (Reshaping, Retiming, Regenerating) according to the related art. Therefore, the fiber optical amplifier is expected to be utilized in various fields, e.g. an undersea optical cable system, and a distributed subscriber system with an optical coupler.

In addition to an application as an optical repeater, the fiber optical amplifier is expected to realize a high optical output power in a sending side and to achieve high-sensitivity reception, which is close to a quantum limit in a receiving side. Therefore, the fiber optical amplifier is expected to eliminate a loss limit of a transmission distance, or a distributing number in a distribution system.

Generally, the fiber optical amplifier is required to include a gain-control function so that a steady optical signal power may be outputted over a wide range of an optical input level. In case of the optical repeater, the gain control function is desirable to fix a level diagram of a system for a long time, and to stabilize transmission characteristics. In a case in which the fiber optical amplifier is an optical preamplifier in a receiving side, AGC (Automatic Gain Control) function of a receiver is practiced. Therefore, a band fluctuation, which may occur when the AGC operation is performed by an electric device, is prevented. Hence, a wide dynamic range is achieved.

This kind of a gain-controllable optical amplifier according to the related art is described in Optical Fiber Technology Vol. 1, No. 1, p.p. 59–71, "Optical Preamplifier Receivers: Application to Long-Haul Digital Transmission, " Y. K. Park and S. W. Granlund.

FIG. 11 shows a configuration of the gain-controllable optical amplifier, which is described in the above document. In this configuration, the gain-controllable optical amplifier is used as an optical preamplifier at a receiving side.

In FIG. 11, an optical signal input terminal 1, an optical isolator 2, a first optical amplifying unit 3 and a second optical amplifying unit 4 are illustrated. Optical fibers 5 and 6, which include a laser active material such as a rare-earth element, transition metal, etc. (hereinafter, a doped fiber), a wavelength-division-multiplexing couplers 7 and 8, which couple an optical signal and an excitation light with a low loss, (hereinafter, WDM couplers), optical isolators 9 and 10, and pump-sources 11 and 12 are also illustrated. Optical filters 13 and 100, which transmit a light of an optical signal wavelength and exclude a noise light which is generated at other wavelengths, a first output signal level detector 15, a photo-diode 16, which performs photoelectric conversion and a preamplifier 17 are also illustrated. A peak detector 18, an optical connector 14, which inputs an output from the second optical amplifying unit 4 to the first output signal level detector 15, optical coupler 101, which couples outputs from the pump-sources 11 and 12, and an pump-source driver 102, which drives the pump-sources are also illustrated.

Operation of a circuit such as that shown in FIG. 4 is discussed below.

An optical signal is inputted from the optical signal input terminal 1 to the first optical amplifying unit 3 via the optical isolator 2. In the doped fiber 5, the first optical amplifying unit amplifies the optical signal by converting an energy of an excitation light, which propagates from the WDM coupler 7 in a reverse way from the optical signal, to an optical signal energy. The amplified optical signal is inputted to the second optical amplifying unit via the optical isolator 9, and amplified further according to the above-stated operation.

The optical isolators 2 and 9 are inserted to prevent the doped fiber 5 from entering unstable conditions, e.g. oscillation due to reflections from input and output sides of the optical amplifying unit 1. The optical filter 100 is inserted between the first optical amplifying unit 3 and the second optical amplifying unit 4. The optical filter 100 is inserted to transmit the optical signal and to exclude noise lights with other wavelengths. Included in the noise lights are a noise light included in the optical signal, which is inputted from the optical signal input terminal, and a spontaneous emission light, which is generated in the doped fiber 5. Generally, the latter is predominant.

An advantage of dividing the optical amplifier into the first optical amplifying unit 3 and the second optical amplifying unit 4 is that a low noise and a high gain are able to be achieved.

Generally, when the doped fiber 5 has a gain of 20 dB or more, spontaneous emission of optical power increases. Consequently, problems of a decrease in the gain and an increase in a noise figure arise. These problems are due to the spontaneous emission light, which propagates in a reverse way from the optical signal. Since the optical isolator 9 is able to cut off the spontaneous emission light, these problems are solved.

The optical signal, which is amplified in the second optical amplifying unit 4, is inputted to the first output signal level detector 15 via the optical filter 13, which is inserted for a same purpose with the optical filter 100, and a photoelectric conversion is performed. The first output signal level detector 15 amplifies a signal, which is converted to a current signal in the photo-diode 16, by the preamplifier 17, and the peak detector 18 detects an amplitude of the signal.

As an application of the optical preamplifier, the first output signal level detector 15 has a function as an optical receiver. An output from the preamplifier 17 is inputted to a synchronous regenerator, which is placed in a later stage, and a digital data is regenerated.

An output from the peak detector 18 is inputted to the pump-source driver 102, and outputs from the pump-sources 11 and 12 are controlled to stabilize the electrical signal amplitude of the preamplifier 17 within a range of allowable control error. The outputs from the pump-sources 11 and 12 are coupled by the optical coupler 101, and inputted to the first optical amplifying unit 3 and the second optical amplifying unit 4. The optical coupler 101 is inserted to configure a redundant structure in which at least one of pump-sources operates, in case one of the pump-sources 11 and 12 is retarded and an emission is stopped. This is possible as the pump-sources 11 and 12 have same functions.

To clarify some problems in the above configuration, a reliance of the noise figure on the input signal power at a time of gain-control is discussed. Generally, when a gain coefficient is "$\gamma$" and a fiber length is "L", a gain G [dB] of the doped fiber is described as follows:

$$G = 10 \times \log\{\exp(\gamma L)\} \quad (1)$$
$$= 4.34 \times \gamma L$$

For a convenience of explanation, the gain coefficient $\gamma$ is assumed to be constant for a longitudinal direction of the doped fiber. When a laser ion density in the doped fiber is $\rho$ [number/m$^3$], a stimulated absorption cross sectional area is $\sigma a$ [m$^2$], a stimulated emission cross sectional area is $\sigma e$ [m$^2$], an overlap integral of the laser ion distribution and an optical intensity distribution is "$\Gamma$" and a proportion of laser ions at each of a ground level and an excitation level is $N_1$, $N_2(N_1+N_2=1)$, the gain coefficient $\gamma$ is described as follows:

$$\gamma = \gamma e - \gamma a \quad (2)$$
$$= \Gamma \times \rho \times \sigma e \times N_2 - \Gamma \times \rho \times \sigma a \times N_1$$

In equation (2), "$\gamma e$" is an emission coefficient, which is proportional to $N_2$, and "$\gamma a$" is an absorption coefficient, which is proportional with $N_1$.

In the gain-controllable optical amplifier of FIG. 11, according to an AGC function, each of gains $G_1$ [dB] and $G_2$ [dB] for each of the doped fibers 5 and 6 depends on an optical signal power $P_{in}$ [dBm], which is inputted from the optical signal input terminal 1, as follows:

$$G_1 + G_2 + P_{in} = G_{1max} + G_{2max} + P_{inmin} = P_{out} = P_{PD} + L \quad (3)$$

In equation (3), $G_{1max}$ is a maximum gain of the doped fiber 5, $G_{2max}$ is a maximum gain of the doped fiber 6, and $P_{inmin}$ is a minimum value of the optical signal power, which is inputted from the optical signal input terminal 1. $P_{out}$ is an optical signal output power of the second optical amplifying unit, $P_{PD}$ is an optical signal power, which is inputted to the first output signal level detector 15, and L is a sum of an insertion loss of the optical filter 13 and a connection loss of the optical connector.

$P_{out}$ and $P_{PD}$ are stabilized according to the AGC function. They are constant regardless of an optical signal power $P_{in}$, which is inputted from the optical signal input terminal 1.

When the optical signal power $P_{in}$ [dBm] increases from the minimum value $P_{inmin}$ [dBm], each of gains $G_1$ [dB] and $G_2$ [dB] for each of the doped fibers 5 and 6 decreases from each of the maximum values $G_{1max}$ [dB] and $G_{2max}$ [dB]. Since the gain-controllable optical amplifier in FIG. 11 has a redundant configuration of the pump-sources, an excitation optical power, which is inputted to each of the doped fibers 5 and 6, fluctuates simultaneously according an AGC operation. Therefore, both of the gains $G_1$ [dB] and $G_2$ [dB] fluctuate.

In FIG. 11, when spontaneous emission coefficients of each of the doped fibers 5 and 6 are $n_{sp1}$ and $n_{sp2}$, a noise figure NF [dB] of the gain-controllable optical amplifier is described as follows:

$$NF = 10 \times \log(2 \times n_{sptotal}) \quad (4)$$
$$= 10 \times \log(2 \times n_{sp1} + 2 \times n_{sp2}/10^{G1/10})$$
$$\approx 10 \times \log(2 \times n_{sp1})$$

Equation (4) shows that when the gain $G_1$ of the doped fiber 5 is larger enough than "1", the noise figure NF [dB] of the gain-controllable optical amplifier depends only on the spontaneous emission coefficient $n_{sp1}$ of the doped fiber 5. The spontaneous emission coefficient $n_{sp1}$ of the doped fiber 5 is described with the emission coefficient and the absorption coefficient in the equation (2) as follows:

$$n_{sp} = \gamma e/(\gamma e - \gamma a) \quad (5)$$

By using equations (1)–(5), the noise figure NF [dB] of the gain-controllable optical amplifier is described as follows:

[Number 1]

$$NF = 10 * \log\left(\frac{2\sigma e}{\sigma a + \sigma e} + \frac{2\sigma e}{\sigma a + \sigma e} * \frac{G1max}{G1}\right) \quad (6)$$

Equation (6) shows that the noise figure NF fluctuates when the gain $G_1$ of the doped fiber 5 fluctuates according to the AGC control. For example, when an erbium doped fiber (EDF) is used as the doped fiber 5 at a signal wavelength of 1550 nm, a stimulated absorption cross sectional area $\sigma a$ [m$^2$] and a stimulated emission cross sectional area $\sigma e$ [m$^2$] are almost equal. When $G_1$ decreases from $G_{1max}=$ 20 dB to 10 dB, the noise figure NF [dB] of the gain-controllable optical amplifier is reduced from 3 dB to 4.8 dB by 1.8 dB.

As stated above, in a gain-controllable optical amplifier according to the related art, each of the excitation optical powers for both of the first optical amplifying unit 3 and the second optical amplifying unit 4 is controlled. Therefore, a reduction of the noise figure tends to occur when a receiving optical power is low. When the noise figure is reduced, a dynamic range of the receiving optical power is restricted.

SUMMARY OF THE INVENTION

An embodiment of this invention seeks to solve the problems in the related art by providing a gain-controllable optical amplifier for amplifying an input signal, which includes a plurality of optical amplifying units cascaded each other, each of which has an output side, an optical fiber, and a pump-source. The amplifier further includes a signal level detector coupled to the output of the plurality of cascaded optical amplifying units, for detecting a power range of the input signal, and a pump-source controller, coupled to the pump-source in each of the optical amplifying units, having an output that controls a pump-source of a selected one of the plurality of optical amplifying units depending on the detected power range of the input signal.

Furthermore, according to an embodiment of the invention, the plurality of optical amplifying units includes a first optical amplifying unit and a second optical amplifying unit. The output of the pump-source controller controls only the pump-source in the first optical amplifying unit when the detected input signal is higher than a determined value. The output of the pump-source controller controls only the pump-source in the second optical amplifying unit when the detected input signal is lower than the determined value.

Furthermore, according to a method for controlling an optical amplifier, which includes a plurality of cascaded optical amplifying units, each of which has a respective one of a plurality of pump-sources.

This method includes the steps of:

measuring a power range of an input signal that is provided to the plurality of cascaded optical amplifying units;

selecting one of the plurality of pump-sources depending on the power range of the input signal; and controlling a power of the selected pump-source.

Furthermore, an apparatus for controlling an optical amplifier has a plurality of cascaded optical amplifying units, each having a respective one of a plurality of pump-source. The apparatus includes a method for measuring a power range of an input signal that is provided to the plurality of cascaded optical amplifying units, a method for selecting one of the plurality of pump-source based upon the power range of the input signal, and a method for controlling a power of the selected pump-source.

Other objects features, and advantages of the invention will be apparent from the following description when taken in conjunction with the accompanying drawings.

DESCRIPTION OF THE PREFERRED EMBODIMENTS

Embodiment 1

A typical communication system according to a gain-controllable optical amplifier according to this invention is explained with respect to embodiment 1.

Figure 1:
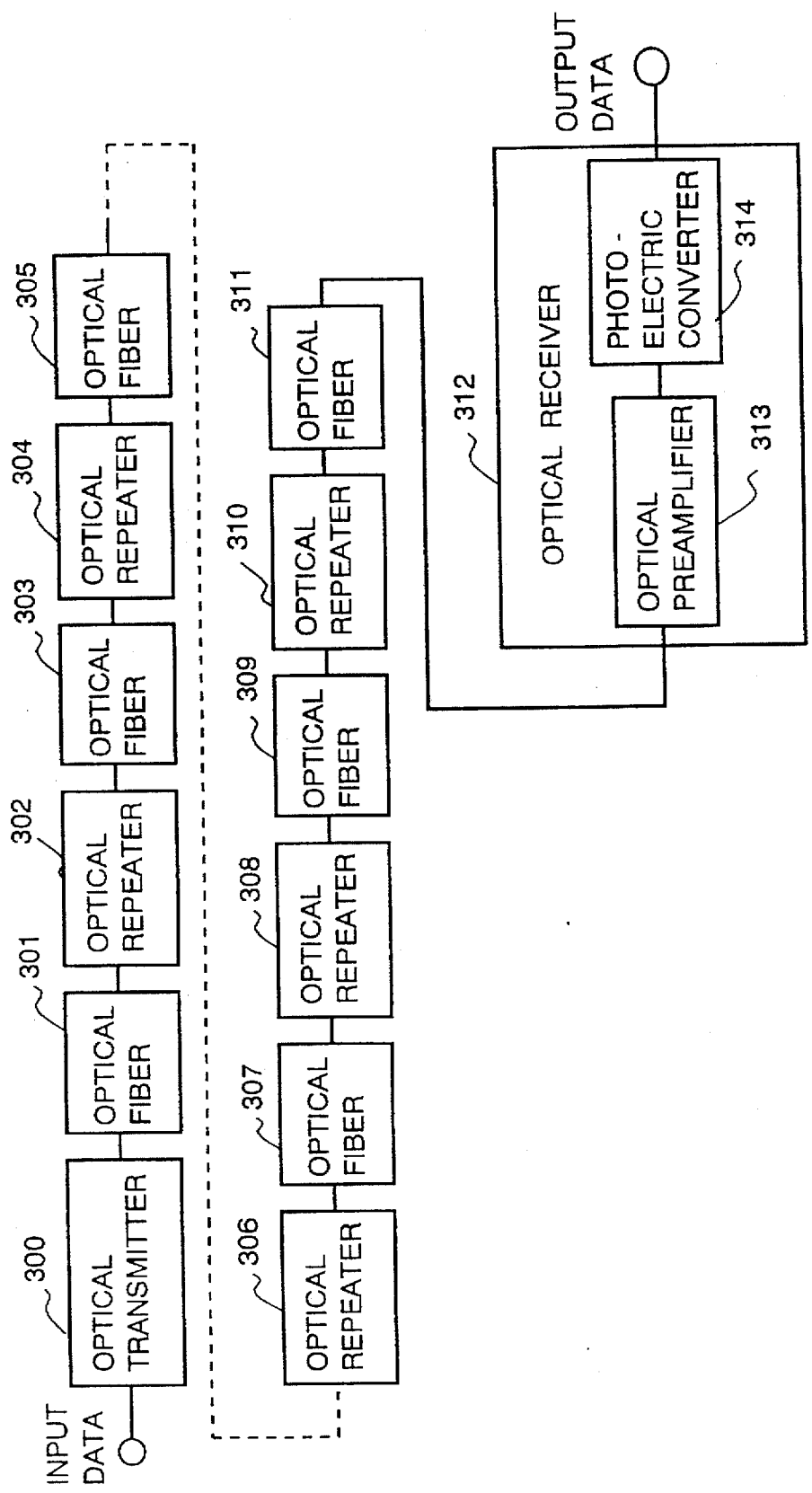
FIG. 1 illustrates a configuration of a communication system, in which the gain-controllable optical amplifier of an embodiment of this invention is used.

FIG. 1 shows a system configuration chart of the communication system. In FIG. 1, an optical transmitter 300 and optical fibers 301, 303, 305, 307, 309 and 311 are illustrated. In FIG. 1, optical repeaters 302, 304, 306, 308 and 310, and an optical receiver 312 having an optical preamplifier 313 and a photoelectric converter 314 are also illustrated.

The gain-controllable optical amplifier according to an embodiment of this invention is used in each of the optical repeaters 302, 304, 306, 308 and 310 and in the optical preamplifier 313 in the optical receiver 312.

In operation, a transmission data is sent from the optical transmitter 300 to the optical receiver 312 via each of the optical repeaters 302, 304, 306, 308 and 310. The transmission data is converted to an electric signal in the photoelectric converter 314, and digital data is regenerated.

Embodiment 2

Figure 2:
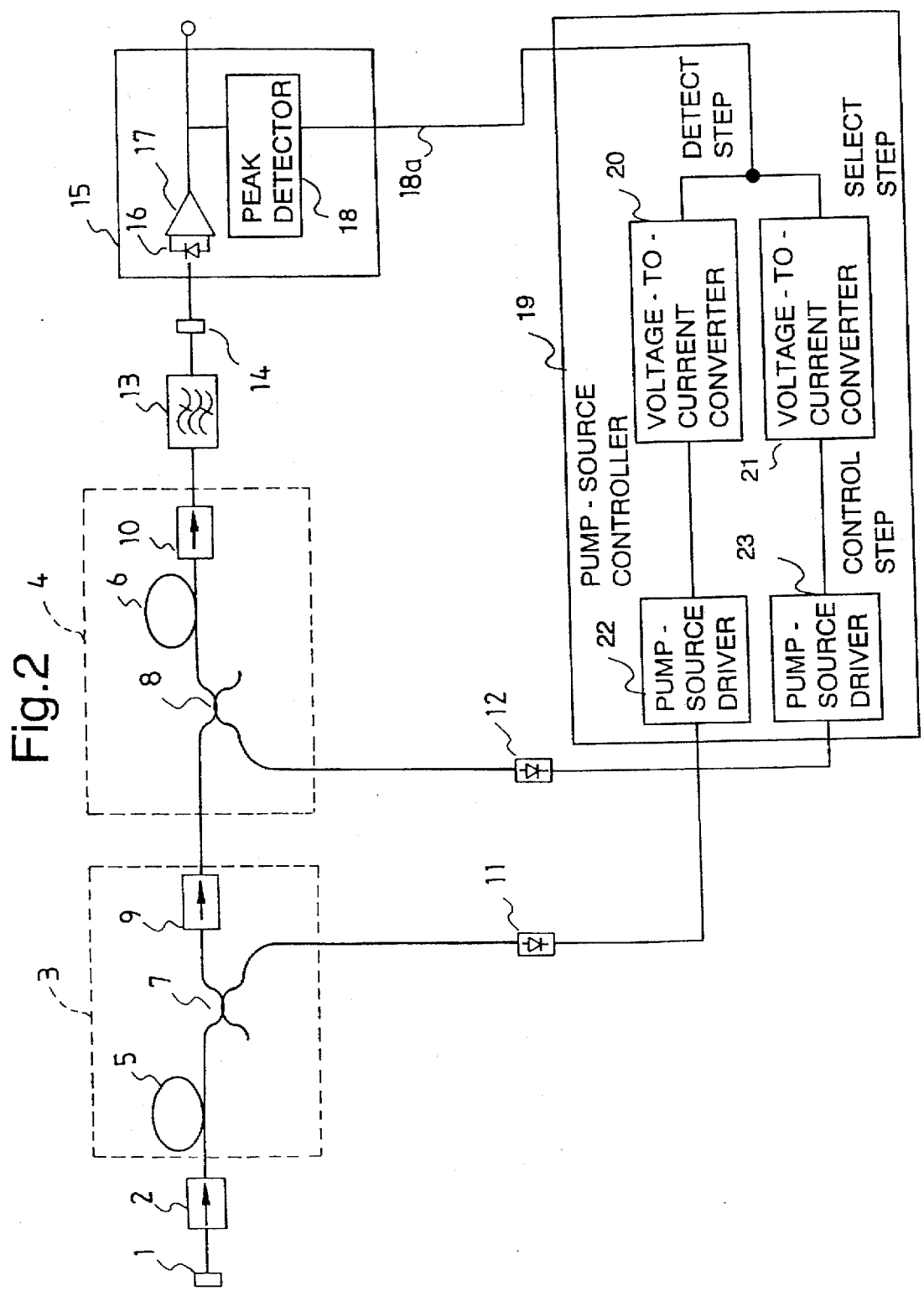
FIG. 2 illustrates a configuration of the gain-controllable optical amplifier of embodiment 1.

FIG. 2 shows a configuration chart of an embodiment, in which the gain-controllable optical amplifier according to this invention is applied to the optical receiver 312 in the communication system of FIG. 1.

In FIG. 2, the gain-controllable optical amplifier is an optical preamplifier in a receiving side, and the first output signal level detector 15 is a receiver. In FIG. 2, each of pump-source controller 19, a first voltage-to-current converter 20, a second voltage-to-current converter 21, a first pump-source driver 22 and a second pump-source driver 23 controls each of the pump-sources 11 and 12 within each of respective input ranges.

In FIG. 2, same signs are used for elements which are used in the explanation of the related arts. The optical coupler 101, which is used in the explanation of the related arts, is not in FIG. 2.

Figure 3:
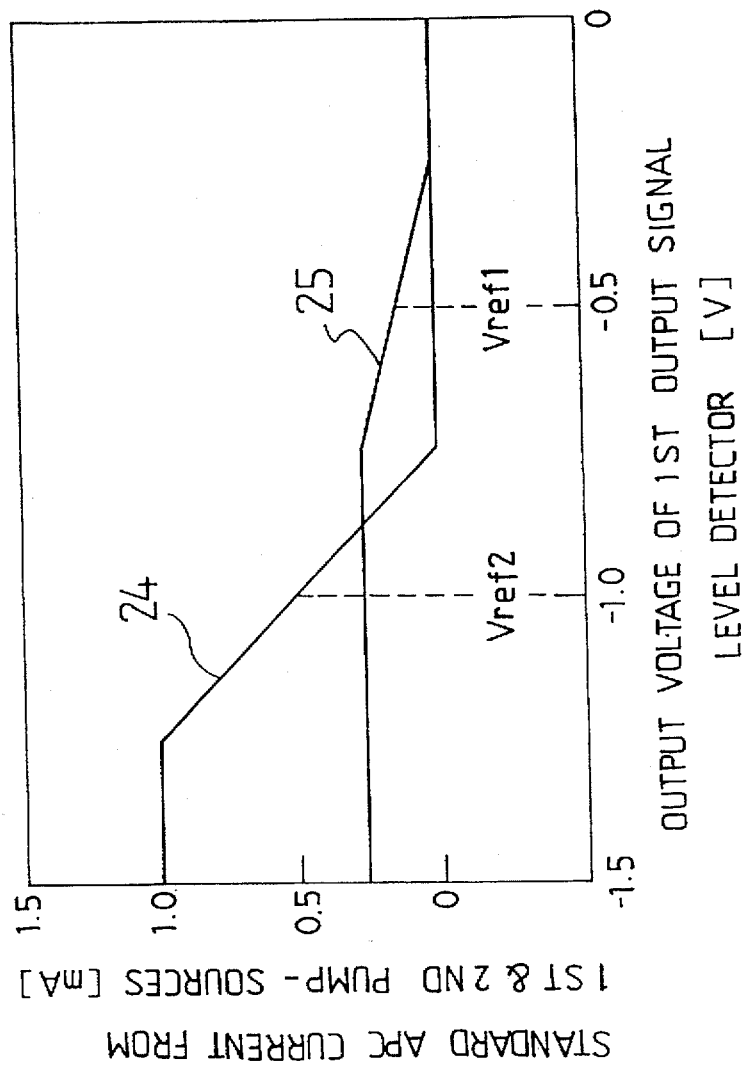
FIG. 3 shows characteristics of the voltage-to-current converter of the gain-controllable optical amplifier of embodiment 1.

FIG. 3 shows an input-output characteristics of each of the first voltage-to-current converter 20 and the second voltage-to-current converter 21. In FIG. 3, input and output characteristics 24 of the second voltage-to-current converter 21 is shown. In FIG. 3, input and output characteristics 25 of the first voltage-to-current converter 20 is also shown.

Operations of an optical receiver with the above configuration are as follows.

A received signal is detected by a peak detector 18 after being converted into a voltage signal. A detected value 18$a$ is inputted to the first voltage-to-current converter 20 and the second voltage-to-current converter 21 in the pump-source controller 19.

Figure 4:
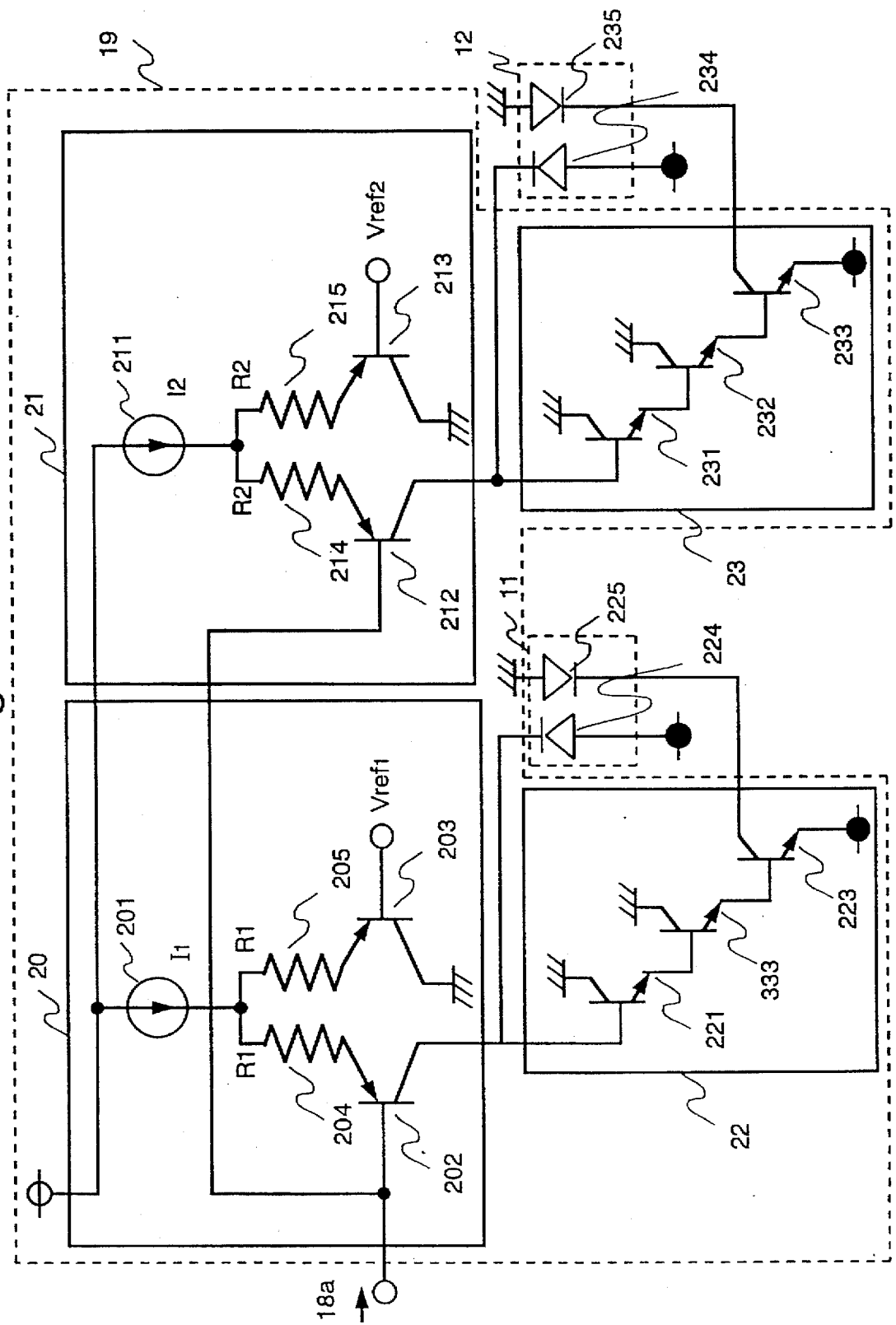
FIG. 4 illustrates a configuration of the pump-source controller of embodiment 1.

FIG. 4 shows a detailed configuration of the pump-source controller 19. In FIG. 4, the voltage-to-current converters 20 and 21 perform same differential operations except that values of each of Vref1 and Vref2, which are shown in FIG. 3, are different.

In FIG. 4, the detected value 18$a$ is inputted to the voltage-to-current converter 20, and inputted to each of differential amplifiers 202 and 203.

In the differential amplifier 202, when the detected value exceeds Vref1, a current in a resistance 204 is lessened to 0 (applicable for an input of −0.5V to 0V in FIG. 3). In the configuration of FIG. 4, Vref1 is used as a standard.

When the detected value 18$a$ is less than Vref1 in the differential amplifier 202, a control current I1 comes to run only in the resistance 204 (applicable for an input of −0.75V or less in FIG. 3). In this way, the first pump-source controller 22 is controlled at a maximum control current. Each of transistors 221, 222 and 223, which are in Darlington connection, drives an infrared diode 226 in the pump-source 11.

Operations of the second voltage-to-current converter 21 and the second pump-source driver 23 may be the same except that Vref2 and a control current I2 are different.

Each of the first voltage-to-current converter 20 and the second voltage-to-current converter 21 offers APC (Automatic Power Control) standard current to each of the first pump-source driver 22 and the second pump-source driver 23. Each of the first pump-source driver 22 and the second pump-source driver 23 generates a driving current, i.e. input and output characteristics of FIG. 3, so that an optical output from each of the first pump-source 11 and the second pump-source 12 becomes proportional with an APC standard current by each of voltage-to-current converters 20 and 21.

In FIG. 3, an output voltage of the first output signal level detector in an x-axis increases, when an optical signal power, which is inputted to the first output signal level detector 15, increases.

The pump-source controller 19 controls an optical output from the first pump-source 11 until an output voltage from the first output signal level detector 15 comes to −0.75V approx. During this operation, the pump-source controller 19 operates linearly, when an input voltage is within a range of −0.25 to −0.75V. When the input voltage becomes −0.75V or less, an output from the second pump-source 12 begins to increase.

Within this range, an output from the first pump-source is fixed at a maximum value. When an input is within a range of −0.75 to −1.25V, the output from the second pump-source 12 increases linearly and reaches a maximum value.

Figure 5:
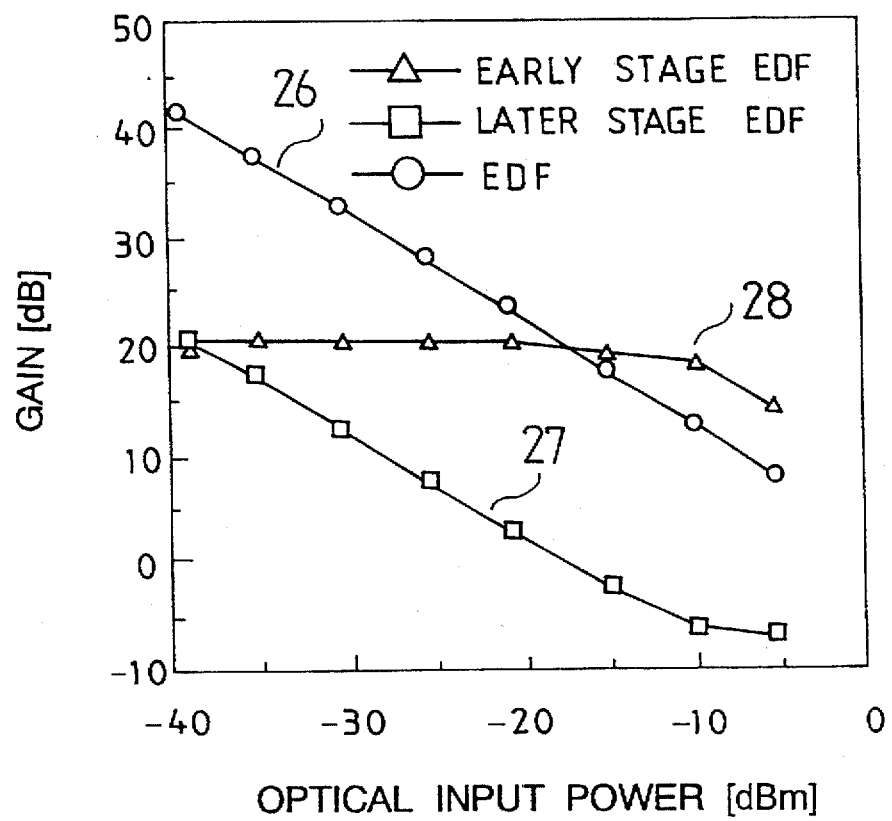
FIG. 5 shows characteristics of an optical input power vs a gain of the gain-controllable optical amplifier of embodiment 1.

FIG. 5 shows characteristics of an optical input power vs a gain of the gain-controllable optical amplifier of FIG. 2. In FIG. 5, a gain 26 of the gain-controllable optical amplifier, a gain 27 of the second optical amplifying unit 4 and a gain 28 of the first optical amplifying unit 3 are shown. In FIG. 5, when an optical input power is with in a range of −40 to −10 dBm, the gain 27 of the second optical amplifying unit 4 is controlled. When an optical input power is −10 dBm or more, the gain 28 of the first optical amplifying unit 3 is controlled.

Figure 6:
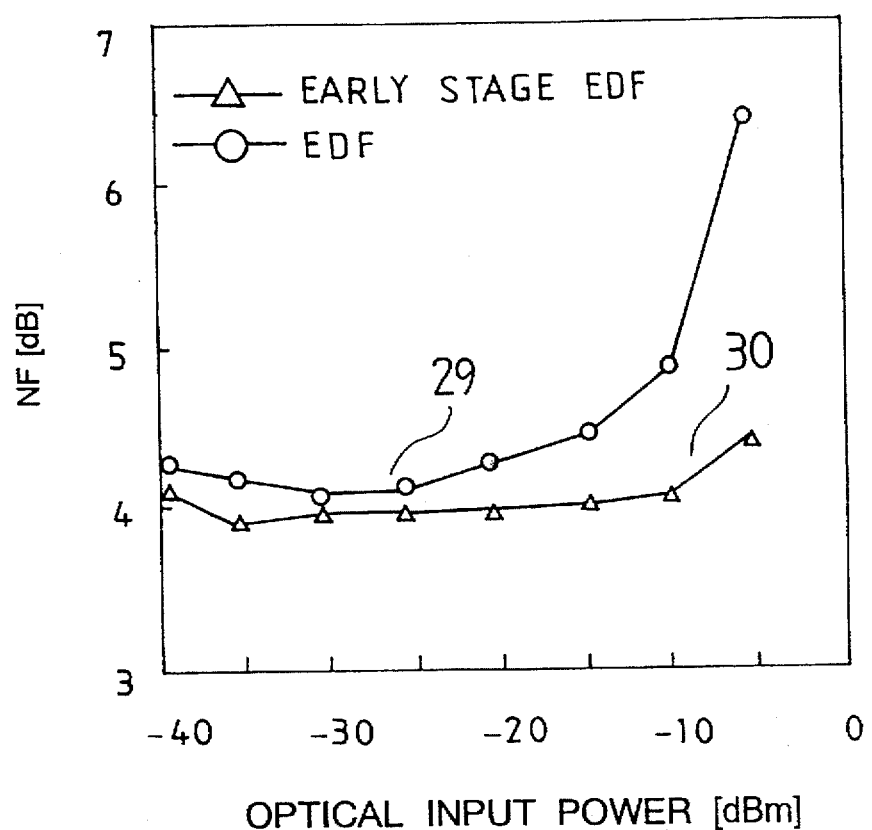
FIG. 6 shows characteristics of an optical input power vs a noise figure of the gain-controllable optical amplifier of embodiment 1.

FIG. 6 shows characteristics of an optical input power vs a noise figure of the gain-controllable optical amplifier, which is illustrated in FIG. 2.

In FIG. 6, a noise figure 29 of the gain-controllable optical amplifier and a noise figure 30 of the first optical amplifying unit 3 are shown.

When the optical input power is within a range of −40 to −10 dBm, in which the gain 28 of the first optical amplifying unit 3 is kept at a maximum value, the noise figure 30 of the first optical amplifying unit 3 is almost kept at a minimum value of 4.1 dBm.

When the optical input power is −10 dBm or more, in which the gain 28 of the first optical amplifying unit 3 is controlled, a degradation of the noise figure 30 of the first optical amplifying unit 3 due to a decrease in the gain is about 0.48 dB.

When the optical input power is within a range of −40 to −20 dBm, the noise figure 29 of the gain-controllable optical amplifier is 4.3 dB, which is close to the noise figure 30 of the first optical amplifying unit 3.

When the optical input power is −20 dBm or more, the gain 27 of the second optical amplifying unit 4 is 0 dB or less, and a signal power, which is amplified in the first optical amplifying unit 3, is converted to a noise light. Therefore, the noise figure 29 of the gain-controllable optical amplifier gradually increases. When the optical input power, in which the gain 28 of the first optical amplifying unit is controlled, is −10 dBm or more, the noise figure degrades rapidly.

However, when the optical input power is within a range of −5 to −40 dB, the noise figure is within a range of 4.1 to 6.5 dB. In this range, sufficient low noise characteristics are realized.

The noise figure includes an insertion loss of 1.0 dB at an optical isolator 2, which is installed after the optical signal input terminal 1. Therefore, when the noise figure at an input point of the doped fiber 5 is calculated, the noise figure within a range of 3.1 to 5.5 dB is obtained. This shows that low noise characteristics are realized.

In an embodiment of this invention, a gain-controllable optical amplifier includes a pump-source controller, which changes controlling objects according to the outputs from the signal level detector and controls the pump-source for each of the controlling objects.

Furthermore, the gain-controllable optical amplifier may include an optical output controller which corresponds to a voltage-to-current controller, which outputs linearly within each of a plurality of defined ranges according to the output from the signal level detector. Therefore, the gain-controllable amplifier, which achieves a low noise for the input signals of a wide range, is realized with a small configuration.

According to this invention, a gain-controllable optical amplifier is provided as a preamplifier of an optical receiver. The gain-controllable optical amplifier connects a plurality of cascaded optical amplifying units, which includes optical fibers and pump-sources. The gain-controllable optical amplifier includes a signal level detector and a pump-source controller, which changes controlling objects according to a detected range of the signal level detector and controls an output from the pump-source of the new controlling object. Hence, an optical receiver with a low noise figure is realized.

Embodiment 3

In embodiment 2, a controller of a hardware circuit is explained. However, other methods besides the method of embodiment 2 may also taken.

In FIG. 2, the value 18a, which is outputted from the peak detector 18 in the output signal level detector 15, is scanned by a general-purpose controller sequentially to find a level. When the level is found, a controlling object is selected, and a corresponding pump-source is controlled. This process is repeated.

In this method, an operation of the pump-source controller 19 includes a step to detect an output signal level, a step to select a controlling pump-source according to the detected level and a step to control an output for the selected pump-source.

In this method, controlling operations of a plurality of loops are able to be performed in a single general-purpose controller depending on an allowance of a delay in controlling time.

Furthermore, according to a gain controlling method of the gain-controllable optical amplifier of this invention, a plurality of optical amplifying units, which are cascaded each other, and a pump-source controller are provided. According to this method, a detection step, a selection step and a control step of the selected object are provided. Therefore, even a general purpose controller is able to control the gain of the optical amplifier.

Embodiment 4

In Embodiment 4, the gain-controllable optical amplifier of this invention is applied to an optical repeater.

Figure 7:
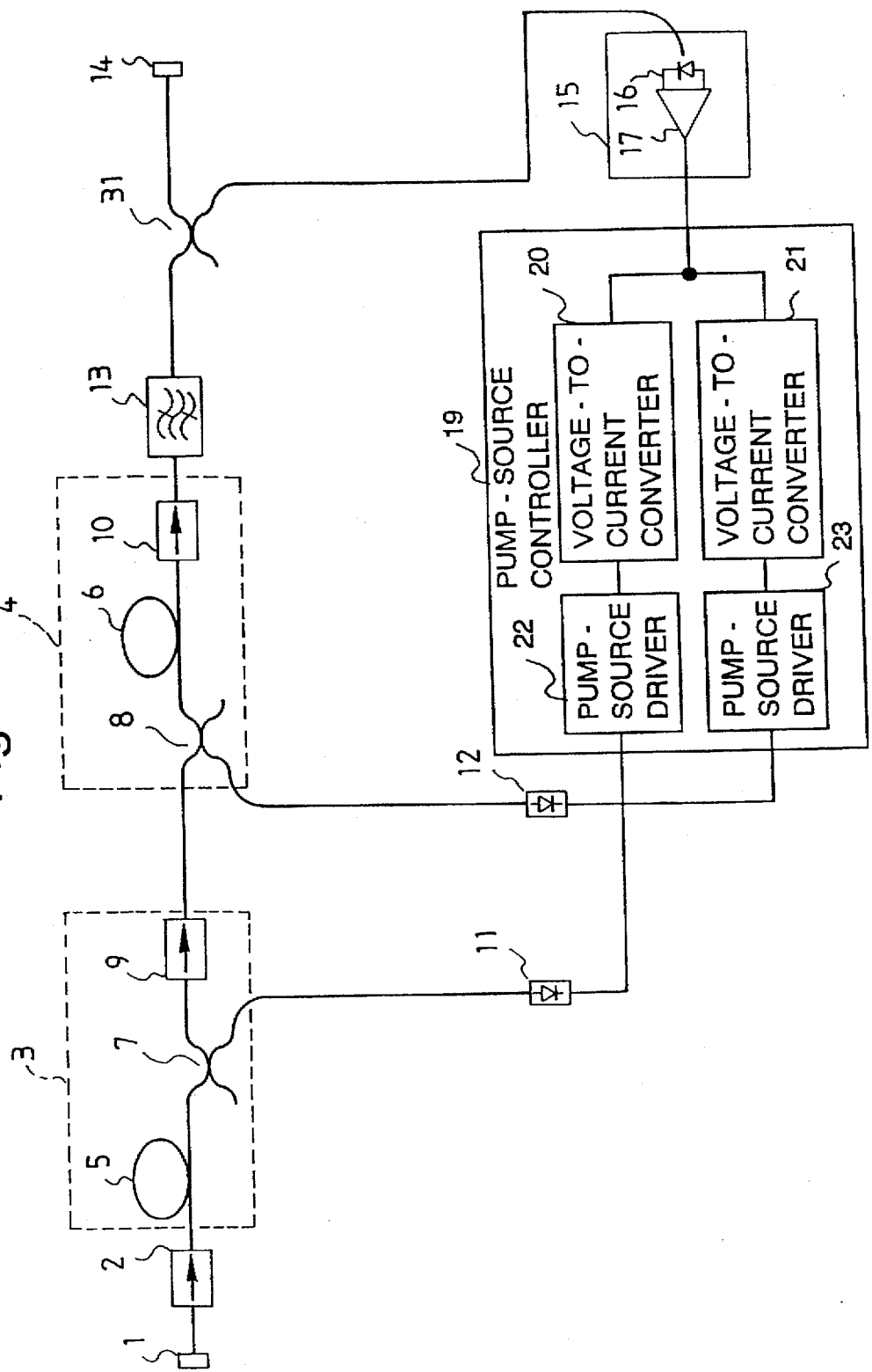
FIG. 7 illustrates a configuration of the gain-controllable optical amplifier of embodiment 4.

FIG. 7 shows a configuration chart of the gain-controllable optical amplifier. In FIG. 7, an optical coupler 31 is illustrated. The optical coupler 31 is placed before an optical connector 14, which is at an output side of the gain-controllable optical amplifier. A part of an outputted optical power is inputted to the first output signal level detector 15.

Operations of the first output signal level detector 15 and the pump-source controller 19 are same as the operations of the gain-controllable optical amplifier of FIG. 2. Therefore, a similar effect is achieved.

According to this embodiment, the optical repeater uses a gain-controllable optical amplifier. The gain-controllable optical amplifier connects a plurality of cascaded optical amplifying units 3, 4, which includes the optical fibers 5, 6 and the pump-sources 11, 12. The gain-controllable optical amplifier includes a signal level detector 15 and a pump-source controller 19, which changes controlling object according to a detected range of the signal level detector and controls an output from a pump-source of a new controlling object. Hence, the optical repeater with a low noise figure is realized.

Embodiment 5

Figure 8:
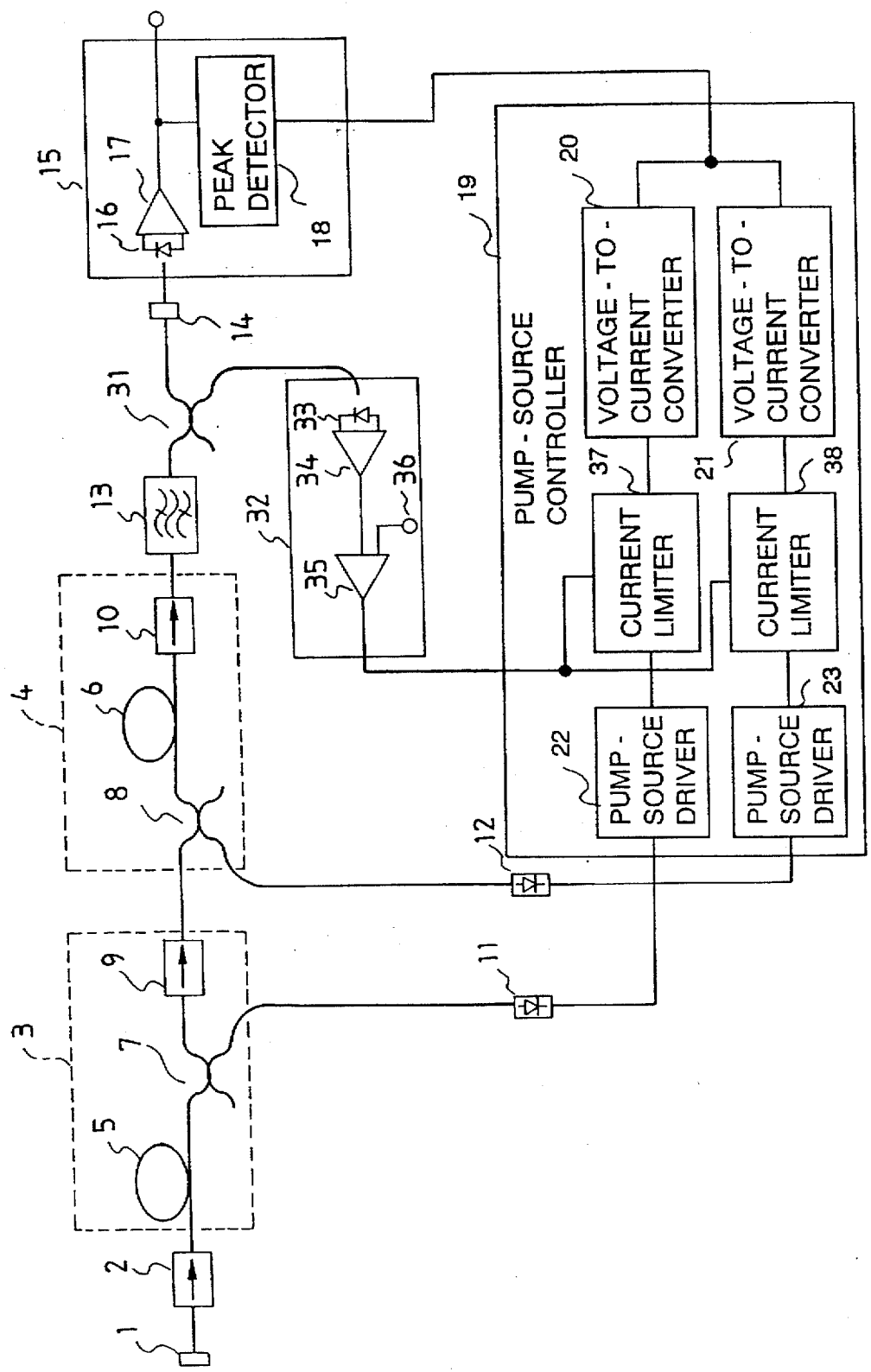
FIG. 8 illustrates a configuration of the gain-controllable optical amplifier of embodiment 5.

FIG. 8 shows a configuration of the gain-controllable optical amplifier of embodiment 5. In this embodiment, the gain-controllable optical amplifier is an optical preamplifier in the receiver.

In some cases, due to limitation in a dissipation power level, size, etc. the gain-controllable optical amplifier and a photoelectric converter and a data regenerator are packaged on separate boards in the receiver.

The coupler 31 and the first output signal level detector 15, which is a photoelectric convertor, are connected via the optical connector 14. However, they are sometimes disconnected for maintenance, regulation, etc. operations. In such cases, the first output signal level detector 15 outputs a control signal to maximize a gain of the gain-controllable optical amplifier regardless of an input signal power to the gain-controllable optical amplifier.

When the optical connecter 14 is reconnected after disconnection, an over-capacity optical signal power is inputted to the first output signal level detector 15. This may destroy the photo-diode 16, and hurt operators' eyes.

In order to avoid this, an optical amplifier with a pump-source current control function as shown in FIG. 8 is used. In FIG. 8, the optical coupler 31, the second output signal level detector 32 and the photo-diode 33 are illustrated. In FIG. 8, a preamplifier 34, a differential amplifier 35, a standard voltage set terminal 36, a first current limiter 37 and a second current limiter 38 are also illustrated.

Operations are as follows.

The optical coupler 31 is provided before the optical connector 14, which is at an output side of the gain-controllable optical amplifier. A part of the output optical power is inputted to the second output signal level detector 32. In the second output signal level detector 32, a signal, which is photo-electrically converted in the photo-diode 33, is amplified in the preamplifier 34. The amplified signal is compared with a standard voltage, which is inputted to the standard voltage set terminal 36, and amplified in the differential amplifier 35.

The standard voltage, which is inputted to the standard voltage set terminal 36, corresponds to a predetermined value $P_{out1}$ of the output optical power of the gain-controllable optical amplifier, which is monitored by the optical coupler 31. When the output optical power of the gain-controllable optical amplifier exceeds the predetermined value $P_{out1}$, the differential amplifier 35 restricts the APC standard current of the first pump-source driver 22 and the second pump-source driver 23 and optical outputs from the first pump-source 11 and the second pump-source 12 by the first and second power limiters 37 and 38.

In this negative-feedback operation, an output power from the gain-controllable optical amplifier is kept at the predetermined value $P_{out1}$ even when the optical connector 14 is disconnected.

When the optical connector 14 is connected, an output power from the gain-controllable optical amplifier is controlled to remain less than the predetermined value $P_{out1}$ in negative-feedback loops of the pump-source controller 19 and the first output signal level detector 15. The predetermined value $P_{out1}$ is defined to be larger than a predetermined value $P_{out2}$, so that the control operations in the two negative-feedback loops do not conflict.

In this way, when the optical connector 14 is connected, operations of the pump-source controller 19 are same as the operations of the gain-controllable amplifier of FIG. 2, and a same effect is achieved.

Furthermore, in addition to a general pump-source controller, a second loop to control outputs with a higher control output power is provided, and outputs from the pump-source controller are controlled. Therefore, even in an extraordinary case, an excessive output is prevented.

Embodiment 6

Operations of embodiment 6 are as follows.

According to the gain-controllable optical amplifier of this embodiment, an input optical signal power to a doped fiber at an unexcited state is made more than ten times of a saturation power of the optical fiber. In this method, polarization reliance of the gain is small, and a loss is small.

Figure 9:
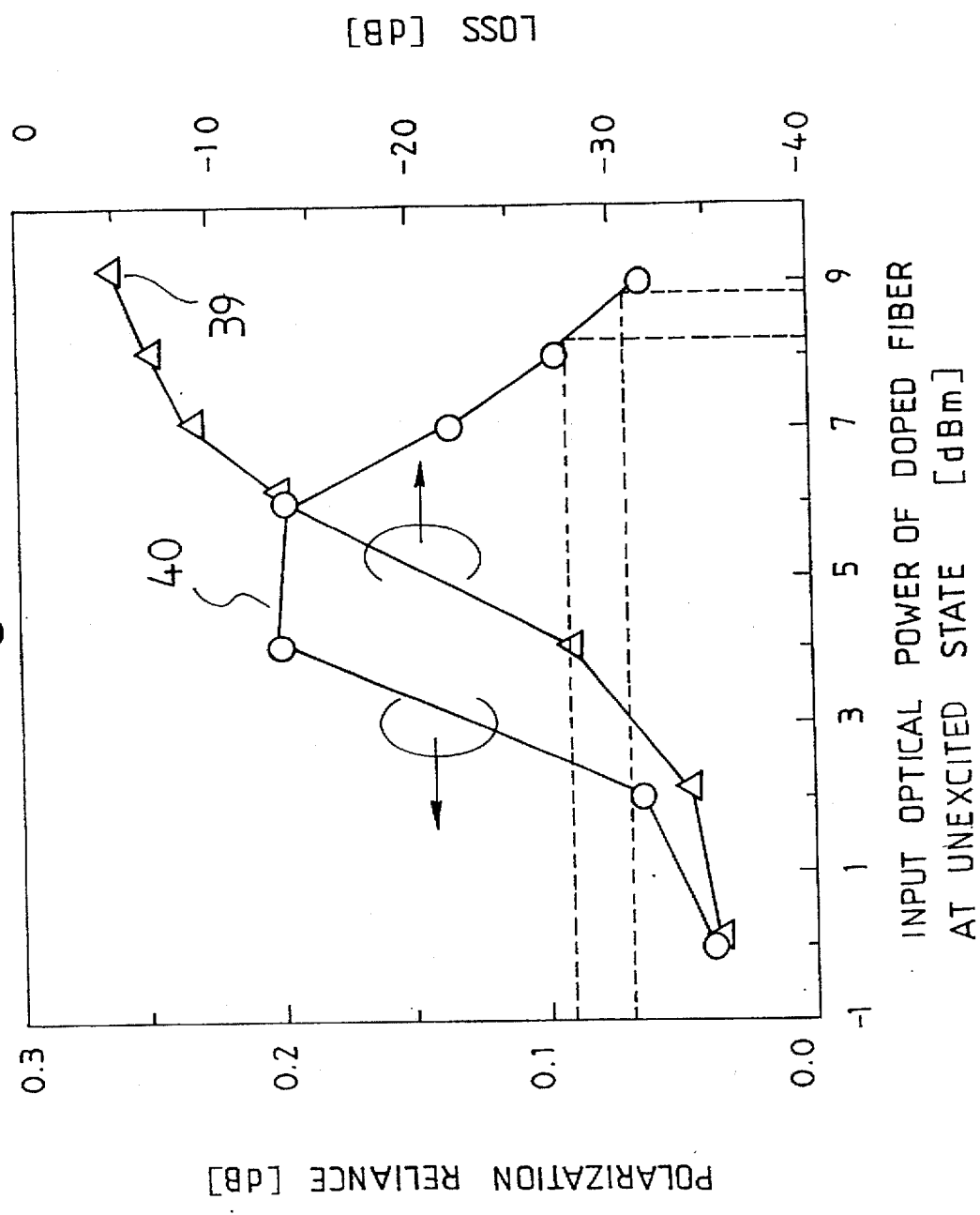
FIG. 9 shows characteristics of a doped fiber at an unexcited state in embodiment 6.

FIG. 9 shows characteristics of the doped fiber 6 at an unexcited state.

In FIG. 9, characteristics 39 of an input optical signal power vs a loss at an unexcited state of the doped fiber 6, polarization reliance 40 of a loss are shown.

The characteristics 39 of an input optical signal power vs a loss at an unexcited state of the doped fiber 6 show typical loss characteristics of an over-saturation absorber. When the input optical signal power is small, a loss is large. When the input optical signal power becomes ten or more than ten times of a saturation power $P_{sat}$, which is determined with an emission coefficient γe and an absorption coefficient γa, a loss rapidly decreases.

In the doped fiber of FIG. 9, the saturation power $P_{sat}$ is 0.32 mW (−4.94 dBm). When the input optical signal power is within a range of +2 to +8 dBm, in which the loss begins to appear, a polarization reliance 40 of the loss shows a peak value of 0.1 to 0.2 dB. When the input optical signal power is outside the range of +2 to +8 dBm, the polarization reliance 40 of the loss shows a value of 0.1 dB or less.

This is caused by anisotropy of the emission coefficient γe and the absorption coefficient γa due to a core form of the doped fiber 6 and asymmetricality of distributions of laser ions. This is also caused by an effect in which a subtle fluctuation of an optical power, which is inputted to the doped fiber 6, is amplified due to a rapid appearance of the characteristics 39 of a input optical signal power vs a loss at an unexcited state. The latter is typically dominant.

A maximum input signal power of the doped fiber 6 is defined with an input signal power to the doped fiber 6 at an unexcited state due the gain control. When the maximum input signal power is determined at +5 dBm, polarization reliance of gain increases. Hence, the gain is fluctuated according to the polarization condition of the input signal to the gain-controllable optical amplifier, and the transmission characteristics are effected.

Therefore, the following method may be applied to satisfy both conditions. An amplifier in a previous stage is controlled to increase the input signal power at an unexcited state, and the maximum input signal power to the doped fiber 6 is determined to be larger enough than the saturation power $P_{sat}$. For example, the maximum input signal power is determined to be ten to 14 times or more of the saturation power. Accordingly, the polarization reliance of the gain decreases, and the loss is decreased.

Furthermore, the input signal power at an unexcited state is set large. Therefore, polarization reliance of the gain is decreased.

Embodiment 7

In embodiment 7, a sample of a low noise optical amplifier, which stabilizes a wavelength and eliminates gain fluctuation due to a wavelength fluctuation, is described.

Figure 10:
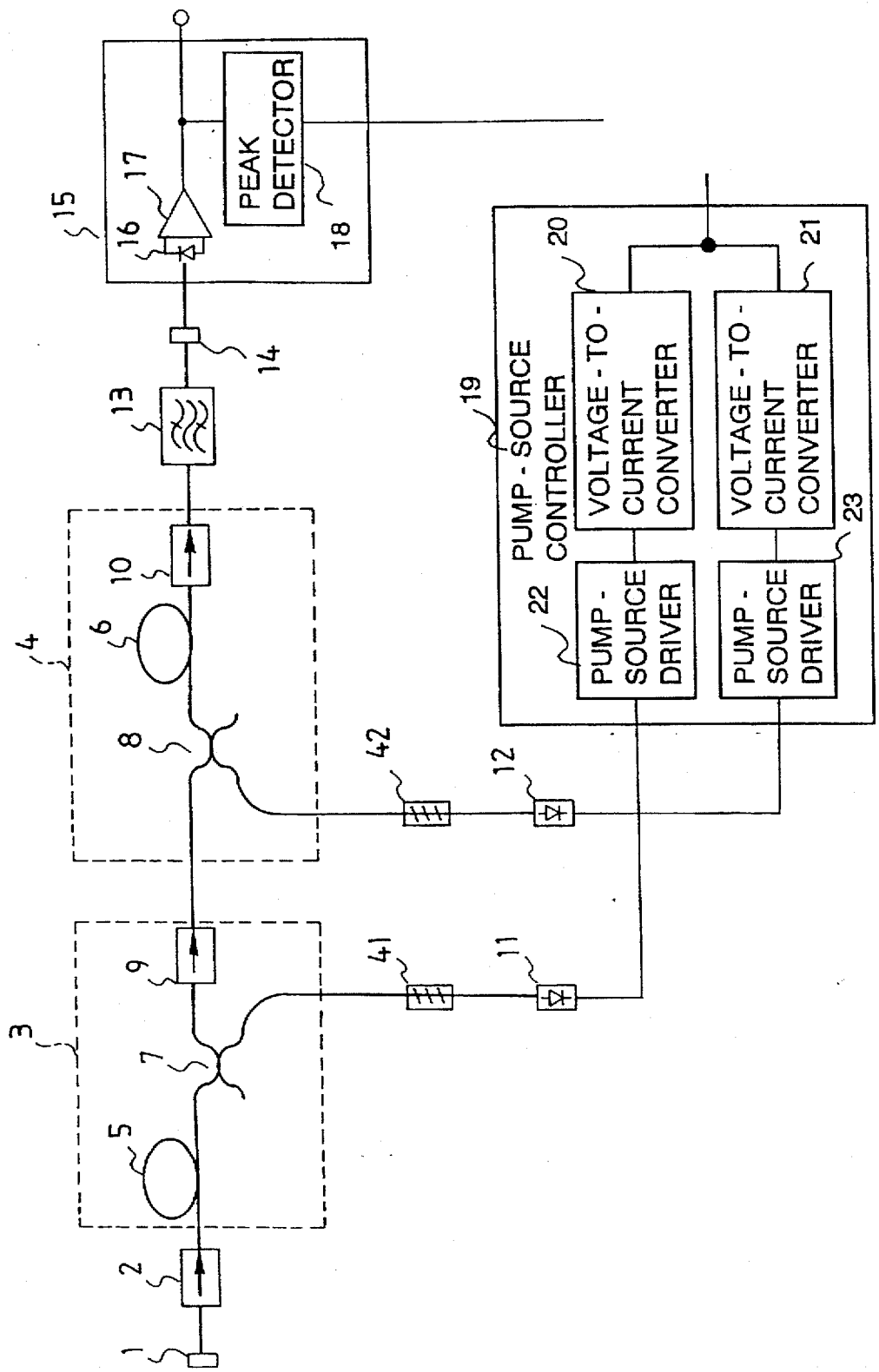
FIG. 10 illustrates a configuration of the gain-controllable optical amplifier of embodiment 7.
Figure 11:
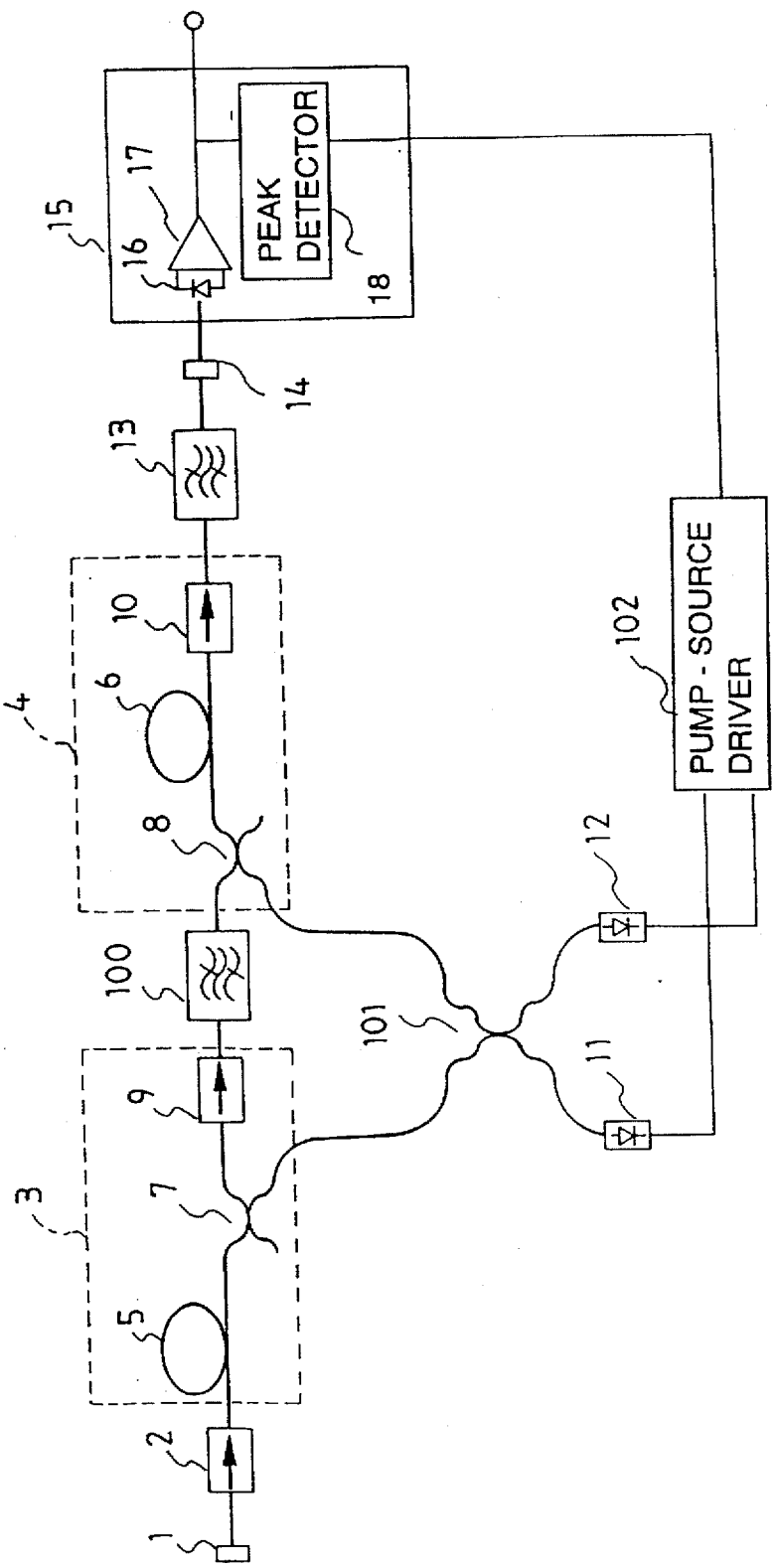
FIG. 11 illustrates a configuration of the gain-controllable optical amplifier according to the related art.

FIG. 10 is a configuration chart of a gain-controllable optical amplifier of embodiment 7. In FIG. 10, fiber gratings 41 and 42, in which a peak wavelength at reflectance is set at a pump-source wavelength, are included.

The operation of this embodiment is as follows.

Generally, a semi-conductor laser of Fabry-Perot type, which easily outputs at a high power, is used as the pump-sources 11 and 12. Hence, an emission occurs at various axial modes, and a mode partition noise occurs when each of the axial modes fluctuates over time. The mode partition noise tends to increase tremendously when the optical output from the pump-sources 11 and 12 fluctuates over time due to the gain control operation. This may cause a problem, especially for a variable gain optical amplifier.

The gain doped fibers 5 and 6 have wavelength reliance of absorption characteristics. In particular, an erbium doped fiber, which is most often used as the doped fiber, has a very narrow band range of around 8 nm as absorption characteristics of 980 nm range, in which low noise characteristics are realized. Therefore, the mode partition noise of the pump-sources 11 and 12 is converted to a fluctuation of an excitation optical power, which is absorbed in the doped fibers 5 and 6. Consequently, a gain fluctuates.

This will give even more influence, when the wavelength fluctuates according to the fluctuation of the output from the pump-sources 11 and 12 due to the gain control.

In the configuration of FIG. 10, an excitation is performed with a light of a narrow wavelength band. Owing to the fiber gratings 41 and 42, the amplifier of embodiment 7 works as an external resonator with a little wavelength selection function depending on the peak wavelength of reflectance of the fiber gratings. An oscillation wavelength is fixed at the peak wavelength of reflectance of the fiber gratings 41 and 42 regardless of the output power.

Therefore, when the reflectance of the fiber gratings 41 and 42 are matched with the peak values of the absorption characteristics of the doped fibers 5 and 6, a stable gain control is performed.

Furthermore, a wavelength selective resonator is provided at an output side of the pump-source. Therefore, an excitation with a stable wavelength is sent to the optical amplifying unit, and a stable gain is achieved.

Embodiment 8

In addition to the stated method to stabilize a gain, a pump-source which has a structured oscillation wavelength and performs a single wavelength operation, may be used as the pump-sources 11 and 12, such as dynamic mono mode laser diode, etc., e.g. distributed feedback laser diode. This gives a similar effect with the method to attach the fiber gratings, which is stated in embodiment 7.

Furthermore, the pump-source may operate in a single wavelength. Therefore, an excitation with a stable wavelength is sent to the optical amplifying unit, and a stable gain is achieved.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A gain-controllable optical amplifier for amplifying an input signal, comprising:

a plurality of optical amplifying units cascaded each other, having an output side, wherein each of the plurality of optical amplifying units includes an optical fiber and a pump-source;

a signal level detector coupled to the output of the plurality of cascaded optical amplifying units, for detecting a power range of the input signal; and a pump-source controller, coupled to the pump-source in each of the optical amplifying units, having an output that controls a pump-source of a first optical amplifying unit of the plurality of optical amplifying units to generate a first output when the detected power range of the input signal is less than a first predetermined value, wherein the pump source controller controls a pump source of a second optical amplifying unit of the plurality of optical amplifying units to generate a second output when the detected power range of the input signal is less than a second predetermined value less than the first predetermined value.

2. The gain-controllable optical amplifier according to claim 1, wherein:

the output of the pump-source controller controls only the pump-source in the first optical amplifying unit when the detected input signal is higher than a determined value; and the output of the pump-source controller controls only the pump-source in the second optical amplifying unit when the detected input signal is lower than the determined value.

3. The gain-controllable optical amplifier according to claim 1, wherein the pump-source controller includes:

a plurality of voltage-to-current converters, each having an output and a plurality of pump-source drivers respectively coupled to the plurality of voltage-to-current converters, for driving a pump-source of each of the plurality of optical amplifying units, wherein the output of each of the plurality of voltage-to-current converters provides a signal that is linear with respect to the input signal within a specific power range of the input signal, and provides a signal that is constant when the input signal is not within the specific power range.

4. The gain-controllable optical amplifier according to claim 3, wherein each of the plurality of voltage-to-current converters includes a differential amplifying unit having a reference input.

5. The gain-controllable optical amplifier according to claim 3, wherein the pump-source driver includes a Darlington amplifier.

6. The gain-controllable optical amplifier according to claim 1, further comprising:

a second signal level detector; and a plurality of current limiters, driven by the second signal level detector, each having an output that limits the output of the pump-source controller.

7. The gain-controllable optical amplifier according to claim 6, wherein output of each of the plurality of current limiters limits the output of the pump-source controller to a value that is larger than a predetermined value.

8. The gain-controllable optical amplifier according to claim 1, wherein the optical fiber is doped with one of a rare earth element and a laser active metal, and wherein a power of the input signal in an unexcited state is substantially 10 times larger than a saturation power of the optical fiber.

9. The gain-controllable optical amplifier according to claim 1, further comprising a wavelength-selective resonator coupled between the pump-source of one of the plurality of amplifying units and the optical fiber of the one of the plurality of amplifying units.

10. The gain-controllable optical amplifier according to claim 1, wherein the pump-source controller comprises a monomode laser diode.

11. The gain-controllable optical amplifier according to claim 10, wherein the monomode laser diode includes a distributed feedback laser diode.

12. The gain-controllable optical amplifier of claim 1 in an optical receiver, the gain-controllable optical amplifier being in combination with a main amplifier for receiving the input signal through the gain-controllable optical preamplifier and for amplifying the input signal.

13. The gain-controllable optical amplifier of claim 1 in an optical repeater, the gain-controllable optical amplifier being in combination with a sending means for sending the input signal to a following stage after amplification.

14. A method for controlling an optical amplifier including a plurality of cascaded optical amplifying units, each having a respective one of a plurality of pump-sources, the method comprising the steps of:

measuring a power range of an input signal that is provided to the plurality of cascaded optical amplifying units;

selecting one of the plurality of pump-sources depending on the power range of the input signal;

controlling a power of the selected pump-source to generate a first output when the power range of the input signal is less than a first predetermined value;

selecting a second of the plurality of pump sources depending on the power range of the input signal; and controlling a power of the second of the plurality of pump sources to generate a second output when the power range of the input signal is less than a second predetermined value less than the first predetermined value.

15. The method of claim 14, wherein the step of measuring includes measuring the power range of the input signal at an output of the cascaded amplifier units.

16. The method of claim 14, wherein the step of controlling includes the steps of:

setting a gain of one of the plurality of cascaded optical amplifying units to be linear with respect to an amplitude of the input signal when the input signal is greater than a predetermined value; and setting the gain of the one of the plurality of cascaded optical amplifying units to be constant when the input signal is not greater than the predetermined value.

17. The method of claim 16, wherein the step of controlling further includes the steps of:

setting a gain of a second one of the plurality of cascaded optical amplifying units to be linear with respect to an amplitude of the input signal when the input signal is not greater than the predetermined value; and setting the gain of the second one of the plurality of cascaded optical amplifying units to be constant when the input signal is greater than the predetermined value.

18. The method of claim 14, wherein the step of controlling includes limiting the power of the selected pump-source to a predetermined value.

19. The method of claim 14, wherein the step of controlling includes:

generating a control signal for the pump-source;

filtering the control signal to a predetermined wavelength to provide a filtered control signal; and providing the filtered control signal to the selected pump-source.

20. An apparatus for controlling an optical amplifier having a plurality of cascaded optical amplifying units, each having a respective one of a plurality of pump-sources, the apparatus comprising:

means for measuring a power range of an input signal that is provided to the plurality of cascaded optical amplifying units;

means for selecting one of the plurality of pump-sources based upon the power range of the input signal;

means for controlling a power of the selected pump-source to generate a first output when the power range of the input signal is less than a first predetermined value;

means for selecting a second of the plurality of pump sources depending on the power range of the input signal; and means for controlling a power of the second of the plurality of pump sources to generate a second output when the power range of the input signal is less than a second predetermined value less than the first predetermined value.

21. The apparatus of claim 20, wherein means for measuring includes means for measuring the power range of the input signal at an output of the cascaded amplifier units.

22. The apparatus of claim 20, wherein the means for controlling includes:

means for setting a gain of one of the plurality of cascaded optical amplifying units to be linear with respect to an amplitude of the input signal when the input signal is greater than a predetermined value; and means for setting the gain of the one of the plurality of cascaded optical amplifying units to be constant when the input signal is not greater than the predetermined value.

23. The apparatus of claim 22, wherein means for controlling further includes:

means for setting a gain of a second one of the plurality of cascaded optical amplifying units to be linear with respect to an amplitude of the input signal when the input signal is not greater than the predetermined value; and means for setting the gain of the second one of the plurality of cascaded optical amplifying units to be constant when the input signal is greater than the predetermined value.

24. The apparatus of claim 20, wherein the means for controlling includes means for limiting the power of the selected pump-source to a predetermined value.

25. The apparatus of claim 20, wherein the means for controlling includes:

means for generating a control signal for the pump-source;

means for filtering the control signal to a predetermined wavelength to provide a filtered control signal; and means for providing the filtered control signal to the selected pump-source.

* * * * *